United States Patent
Chu et al.

(10) Patent No.: US 11,941,190 B1
(45) Date of Patent: Mar. 26, 2024

(54) FULL-AREA TOUCH DEVICE HAVING DEFORMABLE PLATES INTERCONNECTING LIMITING PLATE THAT CONTACTS SWITCH

(71) Applicant: SUNREX TECHNOLOGY CORP., Taichung (TW)

(72) Inventors: Yin Chu, Taichung (TW); Chih-Po Ku, Taichung (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 18/315,786

(22) Filed: May 11, 2023

(30) Foreign Application Priority Data

Feb. 21, 2023 (TW) .................................. 112106340

(51) Int. Cl.
*G06F 3/0354* (2013.01)

(52) U.S. Cl.
CPC ................................ *G06F 3/03547* (2013.01)

(58) Field of Classification Search
CPC .. G06F 3/03547; G06F 3/0202; G06F 3/0338; G06F 1/169; H01H 3/12
See application file for complete search history.

(56) References Cited

U.S. PATENT DOCUMENTS

| | | | |
|---|---|---|---|
| 2015/0185769 A1* | 7/2015 | Takata | G06F 1/169 345/173 |
| 2019/0019639 A1* | 1/2019 | Lane | H01H 3/12 |
| 2021/0263556 A1 | 8/2021 | Degner et al. | |
| 2022/0365558 A1* | 11/2022 | Degner | G06F 3/0338 |
| 2022/0374094 A1* | 11/2022 | Liu | G06F 3/0202 |

FOREIGN PATENT DOCUMENTS

CN 218896352 U * 4/2023

* cited by examiner

*Primary Examiner* — Richard J Hong
(74) *Attorney, Agent, or Firm* — Burris Law, PLLC

(57) ABSTRACT

A full-area touch device includes a base plate of a support unit. Multiple resilient sheet sets are connected to the base plate. An adjusting unit is mounted to the supporting unit, and includes a limiting member and an adjusting member. The adjusting member is disposed under and abuts against the limiting member such that a top end of the limiting member is disposed above the base plate, and is movable to adjust a distance between the top end of the limiting member and the base plate. A touch control unit is mounted to the resilient sheet sets, includes a tact switch that is disposed above and aligned with the limiting member, and is downwardly movable relative to the supporting unit against a resilient force of the resilient sheet sets for contacting the limiting member.

3 Claims, 10 Drawing Sheets

FULL-AREA TOUCH DEVICE HAVING DEFORMABLE PLATES INTERCONNECTING LIMITING PLATE THAT CONTACTS SWITCH

CROSS-REFERENCE TO RELATED APPLICATION

This application claims priority to Taiwanese Patent Application No. 112106340, filed on Feb. 21, 2023.

FIELD

The disclosure relates to an input device adapted for a computer, and more particularly to a full-are touch device adapted for a laptop computer.

BACKGROUND

An existing laptop computer includes an input device, e.g., a touchpad, as an alternative to a mouse.

The input device, as disclosed in US Publication No. US2021263556A1, includes a top plate, a touch sensor disposed on a bottom side of the top plate, a tact switch disposed on a bottom side of the touch sensor, and a support mechanism supporting the top plate. The support mechanism includes a plurality of connecting members, such as bendable or flexible hinges.

When the top plate is pressed, by virtue of the connecting members of the support mechanism being flexible or bendable, the input device is likely to achieve a stable operation as expected. However, due to engineering tolerance during manufacturing and assembling, a stroke of the tact switch may be insufficient for the tact switch to reach a predetermined activation position, and is impossible to be fine-tuned for improvement, thereby increasing a defect rate.

SUMMARY

Therefore, an object of the disclosure is to provide a full-area touch device that can alleviate at least one of the drawbacks of the prior art.

According to the disclosure, a full-area device includes a supporting unit, an adjusting unit, and a touch control unit.

The supporting unit includes a base plate that has a lower end surface and an upper end surface opposite to the lower end surface, and a plurality of resilient sheet sets that are connected to the base plate.

The adjusting unit is mounted to the supporting unit, and includes a limiting member and an adjusting member. The adjusting member is disposed under and abuts against the limiting member such that a top end of the limiting member is disposed above the base plate, and is movable to adjust a distance between the top end of the limiting member and the upper end surface of the base plates.

The touch control unit is mounted to the resilient sheet sets, includes a tact switch that is disposed above and aligned with the limiting member, and is downwardly movable relative to the supporting unit against a resilient force of the resilient sheet sets from an initial position to a pressed position for contacting the limiting member.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
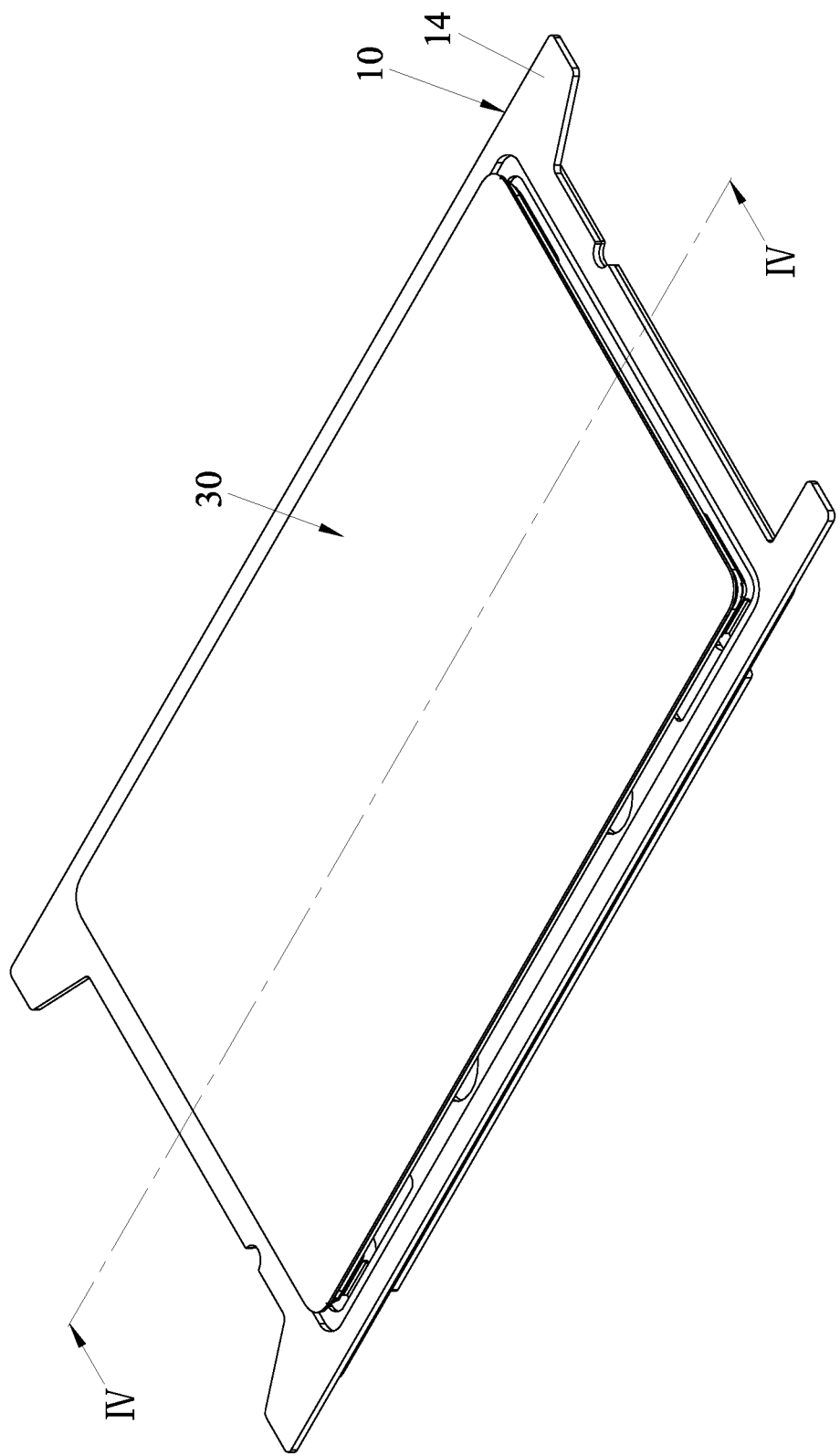
FIG. 1 is a perspective view illustrating a full-area touch device according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
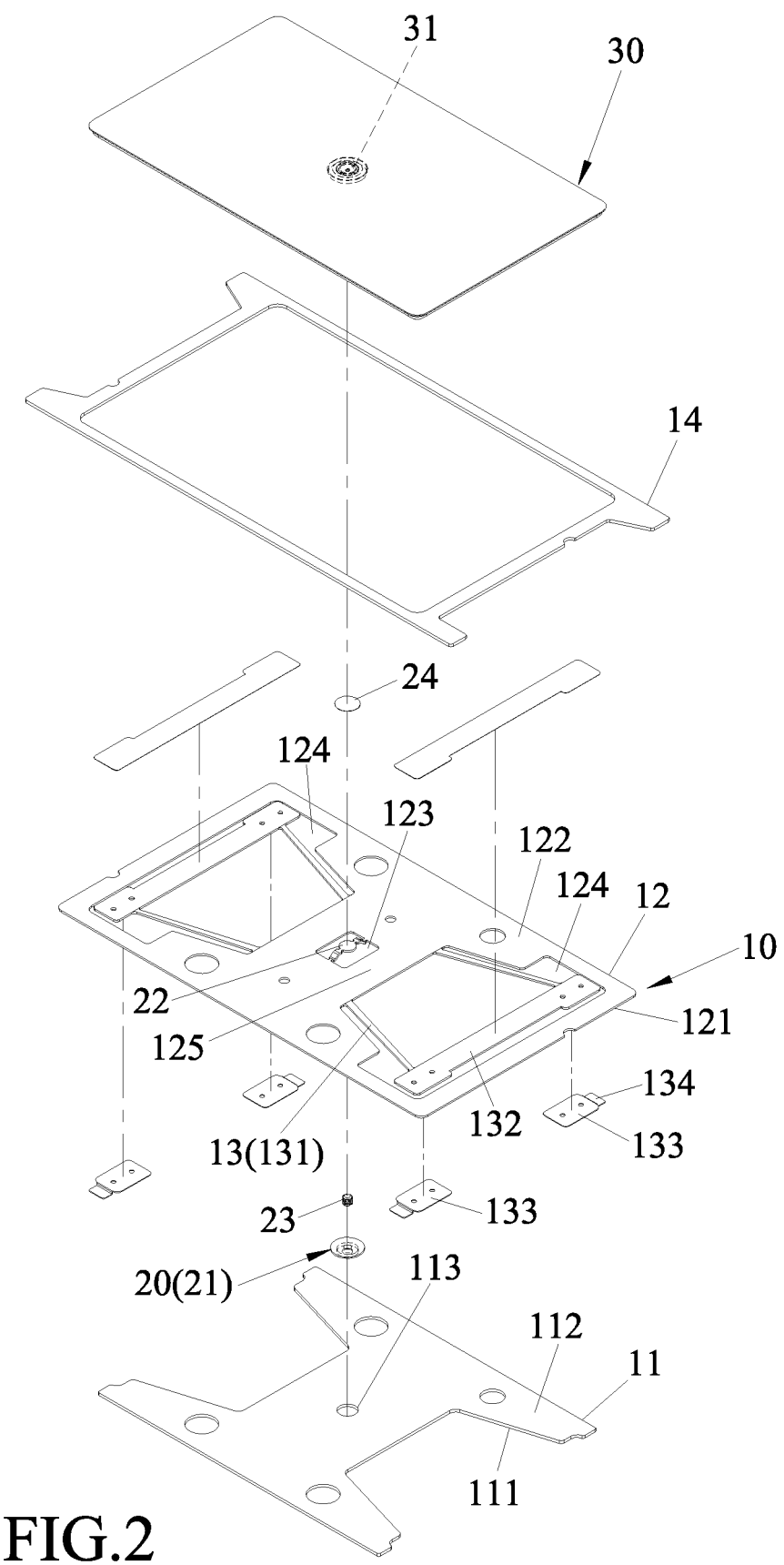
FIG. 2 is an exploded perspective view illustrating the full-area touch device of the embodiment.

Referring to FIGS. 1 and 2, a full-area touch device according to an embodiment of the disclosure is shown and includes a supporting unit 10, an adjusting unit 20, and a touch control unit 30.

Figure 4:
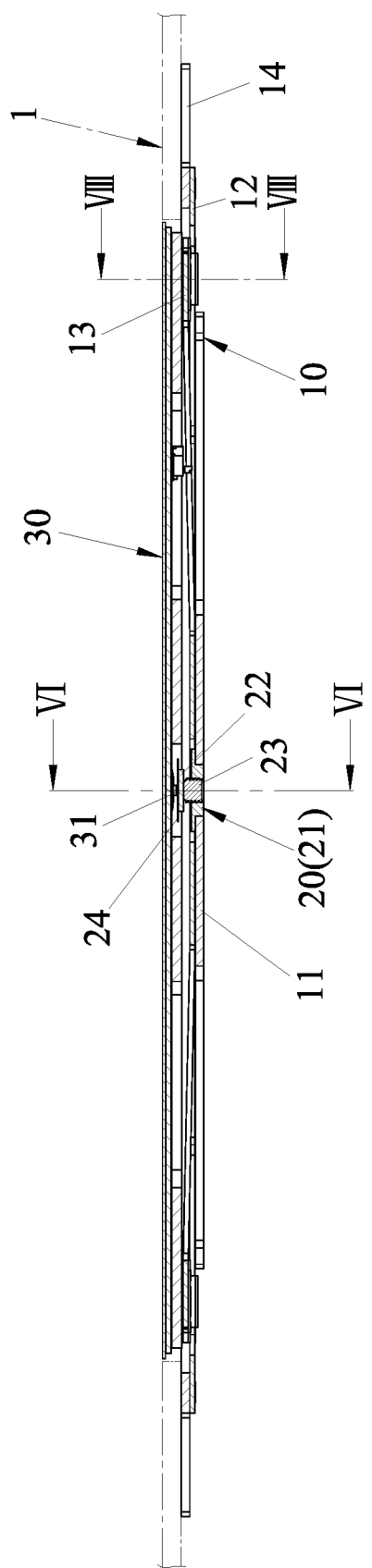
FIG. 4 is a schematic sectional side view taken along line IV-IV of FIG. 1.

The supporting unit includes a bottom plate 11, a base plate 12, a plurality of resilient sheet sets 13, and a reinforcement plate 14. The bottom plate 11 has a top surface 112, a bottom surface 111 that is opposite to the top surface 112, and a positioning hole 113 that extends through the bottom surface 111 and the top surface 112. The base plate 12 is stacked on the bottom plate 11. The base plate 12 has a lower end surface 121, an upper end surface 122, a through hole 123, two hollowed-out openings 124, and an intermediate portion 125. The lower end surface 121 faces and adheres to the top surface 112 of the bottom plate 11 (see FIG. 7). The upper end surface 122 is opposite to the lower end surface 121. The through hole 123 extends through the lower end surface 121 and the upper end surface 122. The two hollowed-out openings 124 are respectively disposed on two sides of the through hole 123 and extend through the lower end surface 121 and the upper end surface 122. The intermediate portion 125 is formed with the through hole 123. The resilient sheet sets 13 are connected to the base plate 12 and are swingable in the hollowed-out openings 124. Each of the resilient sheet sets 13 includes two resilient strips 131 that are connected to the intermediate portion 125, a swing plate 132 that is connected between the resilient strips 131, and two blocking plates 133 that adhere to the swing plate 132. Each of the blocking plates 133 has a protrusion 134 (see FIG. 8) that faces to and is limitable by the lower end surface 121 of the base plate 12. The reinforcement plate 14 is formed as a hollow frame and adheres to the upper end surface 122 of the base plate 12 opposite to the bottom surface 111 of the bottom plate 11, thereby reinforcing a structural strength of the base plate 12. As shown in FIG. 4, the reinforcement plate 14 is fixed to a casing 1.

Figure 3:
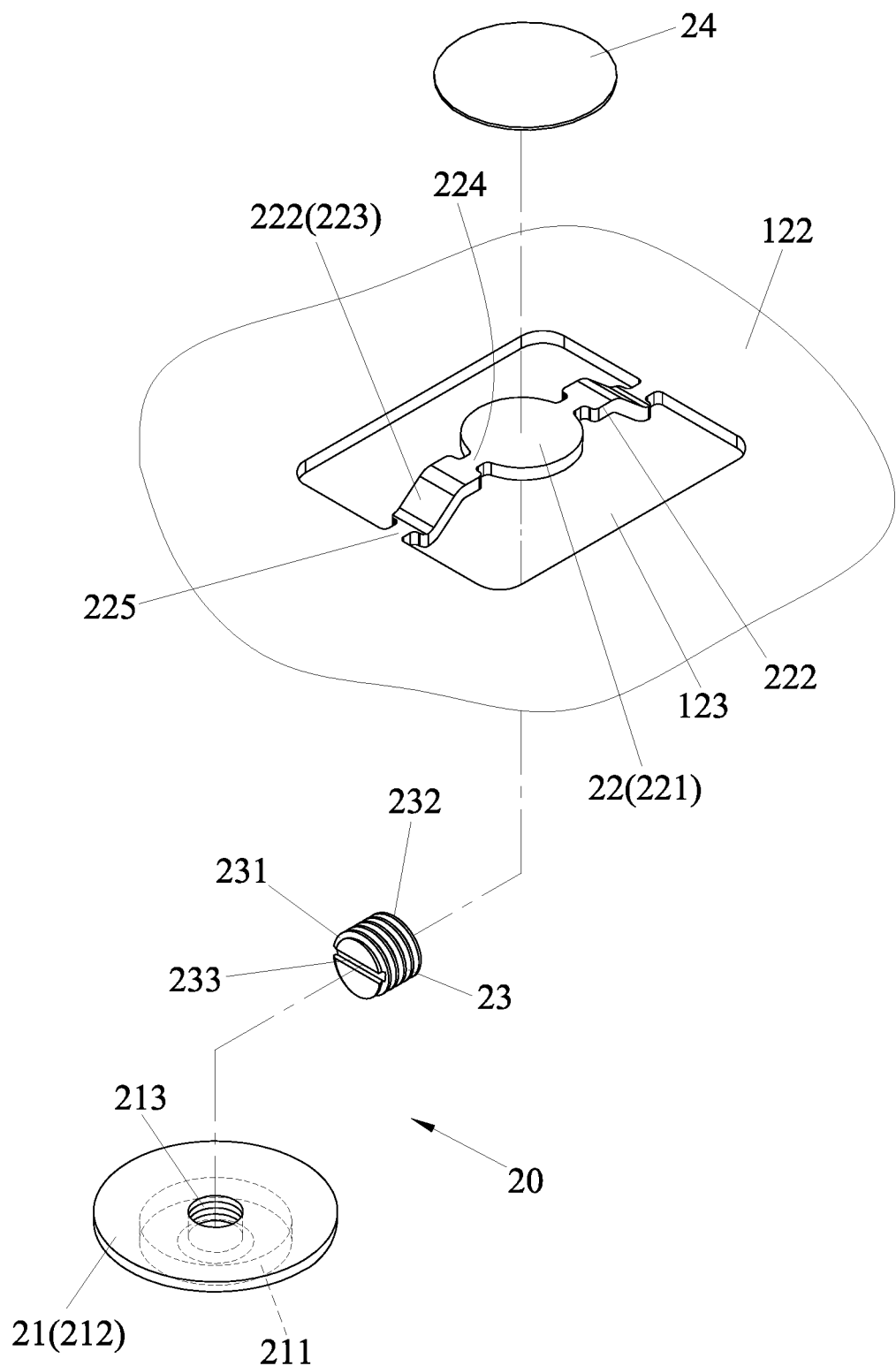
FIG. 3 is a fragmentary enlarged perspective view of the embodiment illustrating an adjusting unit and a base plate of the full-area touch device.
Figure 6:
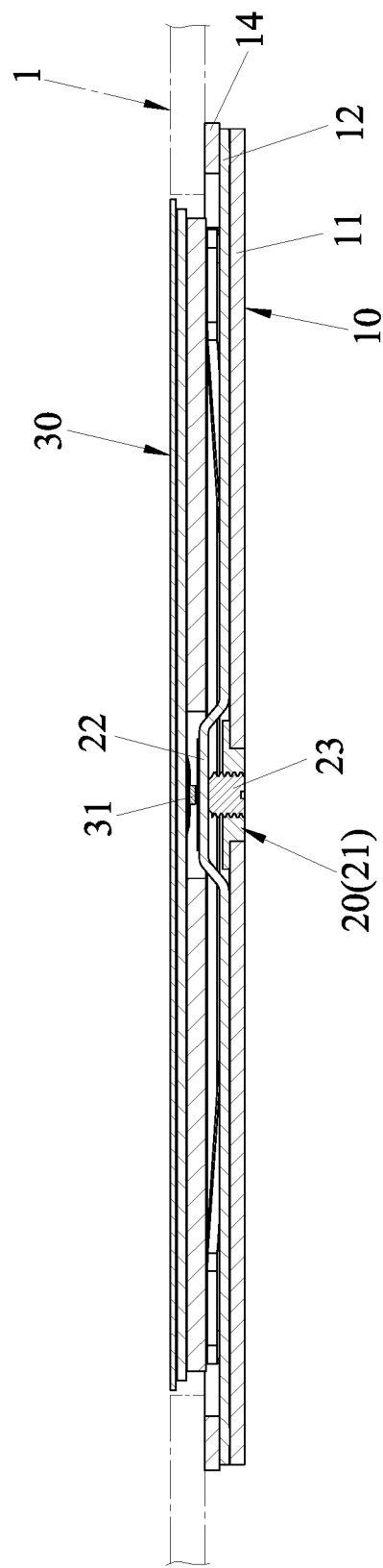
FIG. 6 is a sectional view taken along line VI-VI of FIG. 4, illustrating a touch control unit in an initial position relative to a support unit of the full-area touch device.
Figure 7:
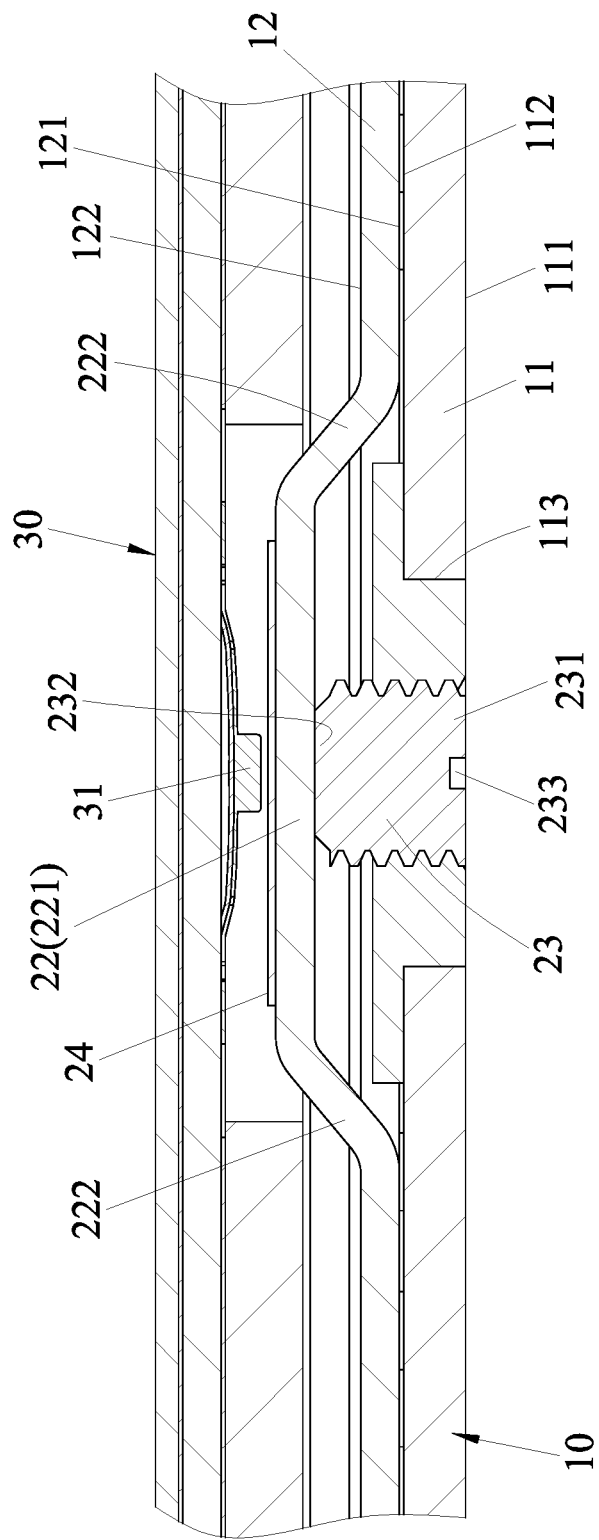
FIG. 7 is an enlarged sectional view of FIG. 6.
Figure 8:
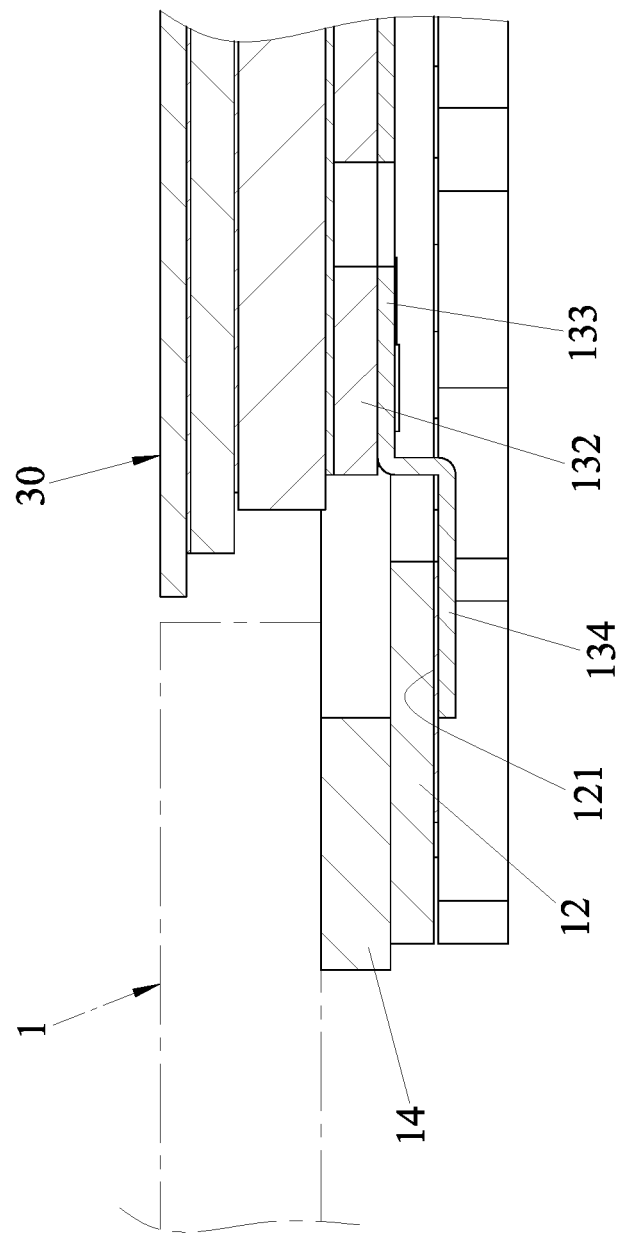
FIG. 8 is a sectional view taken along line VIII-VIII of FIG. 4, illustrating abutment of a protrusion of a blocking plate against the base.

Referring to FIGS. 3, 6, and 7, the adjusting unit 20 is mounted to the supporting unit 10, and includes a nut member 21, a limiting member 22 connected to the base plate 12, and an adjusting member 23. The adjusting member 23 is disposed under and abuts against the limiting member 22 such that a top end of the limiting member 22 is disposed above the base plate 12, and is movable to adjust a distance between the top end of the limiting member 22 and the upper end surface 122 of the base plate 12.

The nut member 21 is mounted on the bottom plate 11, is formed as a stepped disc, and has a lower portion 211, an upper portion 212, and a threaded hole 213. The lower portion 211 engages the positioning hole 113. The upper portion 212 is connected to a top end of the lower portion 211 and has an outer diameter greater than that of the lower portion 211. The threaded hole 213 extends through the upper portion 212 and the lower portion 211.

The limiting member 22 has a circular limiting plate 221 and a pair of connecting plates 222. The circular limiting plate 221 is disposed above the upper end surface 122 of the base plate 12 in alignment with the through hole 123. The connecting plates 222 interconnect the circular limiting plate 221 and the base plate 12, and are deformable to produce movement of the circular limiting plate 221 relative to the base plate 12. The adjusting unit 20 further includes a buffer plate 24 that adheres to the circular limiting plate 221.

Each of the connecting plates 222 has a widened portion 223, a first neck portion 224, and a second neck portion 225. The first neck portion 224 is connected between the widened portion 223 and the circular limiting plate 221, and is narrower than the widened portion 223. The second neck portion 225 is connected between the widened portion 223 and the base plate 12, and is narrower than the widened portion 223. By virtue of the first neck portion 224 and the second neck portion 225 of each of the connecting plates 222, the connecting plates 222 are easily deformable to produce movement of the circular limiting plate 221 together with the buffer plate 24 relative to the base plate 12.

The adjusting member 23 extends through the through hole 123, and has a bottom end portion 231 and a top end portion 232. The bottom end portion 231 is threadedly secured to the nut member 21 and is formed with an operation recess 233. The top end portion 232 is opposite to the bottom end portion 231 and abuts against the circular limiting plate 221 of the limiting member 22. In this embodiment, the bottom end portion 231 threadedly engages the threaded hole 213.

Figure 5:
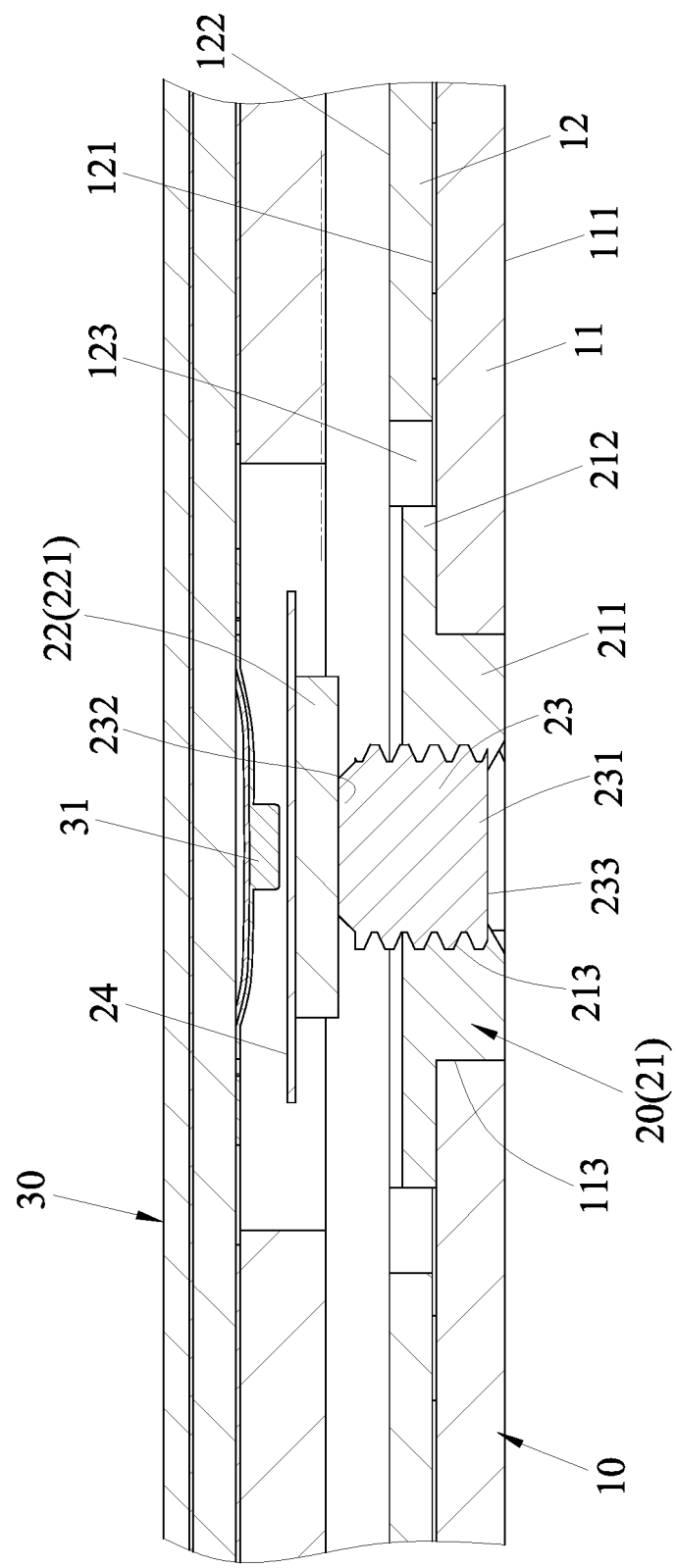
FIG. 5 is an enlarged sectional view from FIG. 4.

The touch control unit 30 is adhesively mounted to the swing plates 132 of the resilient sheet sets 13, and is downwardly movable relative to the base plate 12 of the supporting unit 10 against a resilient force of the resilient sheet sets 13 from an initial position (see FIGS. 5 to 7) to a pressed position (see FIGS. 9 and 10) for contacting the limiting member 22. The touch control unit 30 includes a tact switch 31 that is disposed above and aligned with the limiting member 22. In this embodiment, the circular limiting plate 221 is disposed between the tact switch 31 and the adjusting member 23.

Referring to FIGS. 1, 2, 4 to 8, after the all-area touch device of the disclosure is completely assembled, the adjusting member 23 is secured to the nut member 21 mounted on the bottom plate 11, and the top end portion 232 of the adjusting member 23 abuts against a bottom end of the circular limiting plate 221. As shown in FIGS. 1, 2, 4 to 8, when the touch control unit 30 is in the initial position, the swing plate 132 of each of the resilient sheet sets 13 is resiliently forced by the resilient strips 131 to move upwardly, such that the tact switch 31 is in noncontact with the circular limiting plate 221 and is deactivated, and such that the protrusions 134 of the blocking plates 133 abut against the lower end surface 121 of the base plate 12 to limit movement of the touch control unit 30 upwardly relative to the base plate 12.

Figure 9:
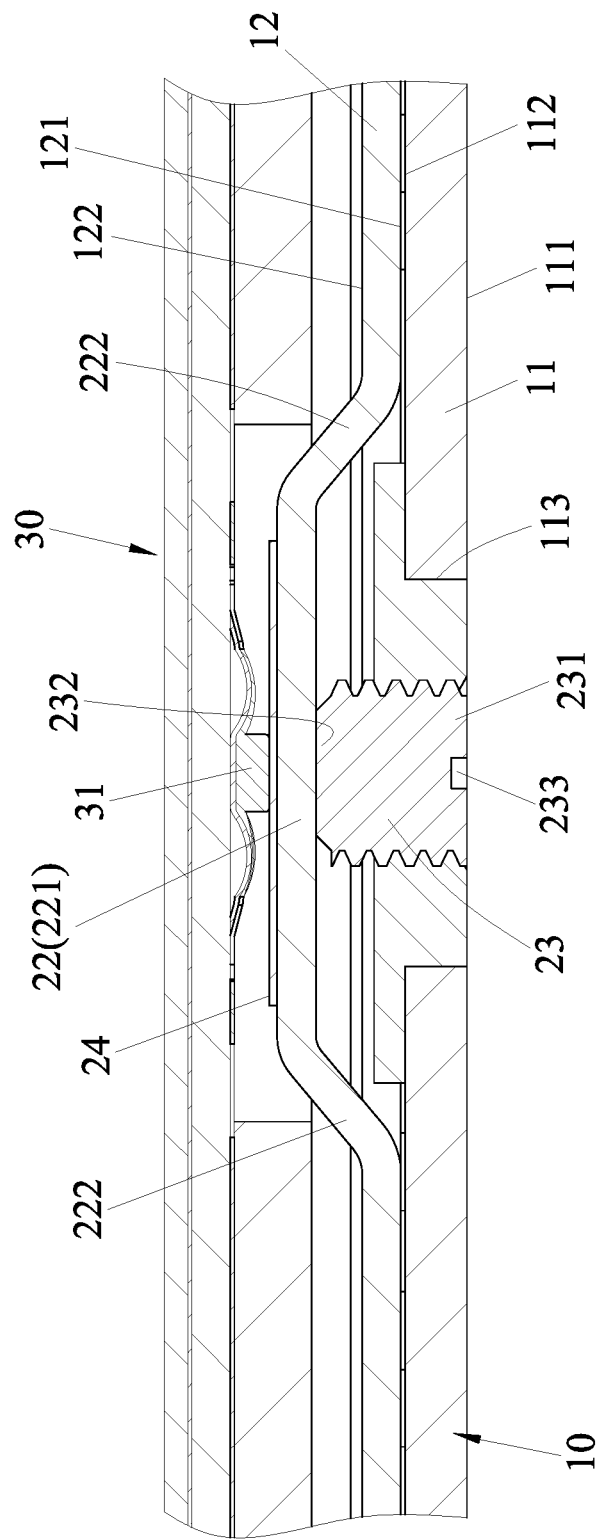
FIG. 9 is a schematic sectional view similar to FIG. 7, but illustrating the touch control unit being operatively moved to a pressed position relative to a support unit of the full-area touch device.
Figure 10:
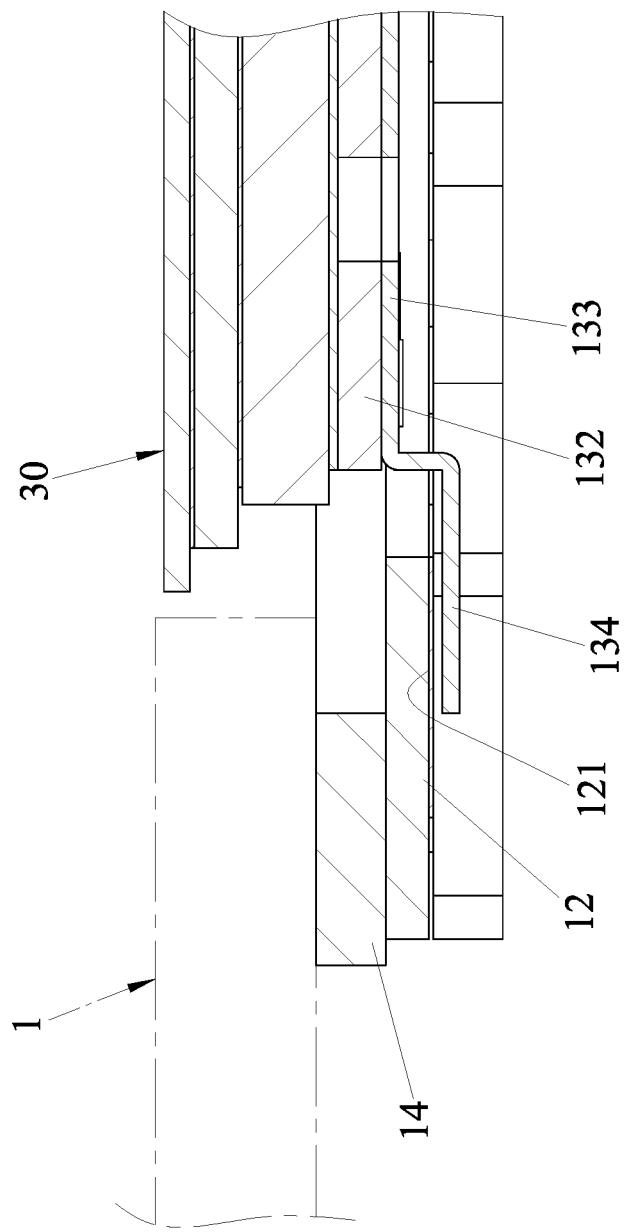
FIG. 10 is a schematic sectional view similar to FIG. 8, but illustrating the protrusion of the blocking plate moved away from the base plate.

As shown in FIGS. 9 and 10, when the touch control unit 30 is pressed to move downwardly toward the support unit 10, the resilient sheet sets 13 are pressed by the touch control unit 30 to swing downwardly relative to the hollowed-out openings 124, such that the protrusions 134 of the resilient sheet sets 13 move away from the lower end surface 121 of the base plate 12, and such that the resilient strips 131 of the resilient sheet sets 13 are resiliently deformed. As the touch control unit 30 is moved to the pressed position, the tact switch 31 is in contact with and is activated by the circular limiting plate 221 to generate signals. In addition, the buffer plate 24 adhering to the circular limiting plate 221 buffers against an impact generated by contact between the tact switch 31 and the circular limiting plate 221.

When the touch control unit 30 adhesively mounted to the swing plates 132 of the resilient sheet sets 13 is not pressed, by virtue of the swing plate 132 being connected between the resilient strips 31 of each of the resilient sheet sets 13, the resilient strips 131 of the resilient sheet sets 13 resiliently force the touch control unit 30 to move to the initial position as shown in FIGS. 4 to 8.

In mass production, due to engineering tolerance during manufacturing and assembling, a stroke of the tact switch 31 may be insufficient for the tact switch 31 to reach a predetermined activation position for contacting the circular limiting plate 221. In this case, a tool (e.g., a screwdriver) may be used to engage the operation recess 233 of the adjusting member 23 from the bottom surface 111 of the bottom plate 11 so as to rotate the adjusting member 23. By virtue of the connecting plates 222 being deformable to produce movement of the circular limiting plate 221 relative to the base plate 12, and by virtue of the adjusting member 23 abutting against the limiting member 22, the circular limiting plate 221 is fined-tuned by rotation of the adjusting member 23 so as to move away from the base plate 12 and toward the tact switch 31 of the touch control unit 30, thereby reducing a defect rate. In other words, a distance between the tact switch 31 and the circular limiting plate 221 may be fine-tuned by the adjusting member 23, so that the tact switch 31 may reach the predetermined activation position for contacting the circular limiting plate 221.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without the another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A full-area touch device comprising:
   a supporting unit including
      a base plate that has a lower end surface and an upper end surface opposite to said lower end surface, and
      a plurality of resilient sheet sets that are connected to said base plate;
   an adjusting unit mounted to said supporting unit and including
      a limiting member, and
      an adjusting member that is disposed under and abutting against said limiting member such that a top end of said limiting member is disposed above said base plate, and that is movable to adjust a distance between said top end of said limiting member and said upper end surface of said base plate; and
   a touch control unit mounted to said resilient sheet sets, including a tact switch that is disposed above and aligned with said limiting member, and being downwardly movable relative to said supporting unit against a resilient force of said resilient sheet sets from an initial position to a pressed position for contacting said limiting member;
   wherein said base plate further has a through hole that extends through said lower end surface and said upper end surface;
   wherein said supporting unit further includes a bottom plate, said base plate being stacked on said bottom plate, said bottom plate having a top surface that faces said lower end surface of said base plate;
   wherein said adjusting unit further includes a nut member mounted on said bottom plate;
   wherein said adjusting member extends through said through hole, and has
      a bottom end portion that is threadedly secured to said nut member and that is formed with an operation recess, and
      a top end portion that is opposite to said bottom end portion and that abuts against said limiting member; and
   wherein said limiting member has
      a circular limiting plate that is disposed between said tact switch and said adjusting member, said adjusting member abutting against said circular limiting plate, and
      a pair of connecting plates that interconnect said circular limiting plate and said base plate, and that are deformable to produce movement of said circular limiting plate relative to said base plate.

2. The full-area touch device as claimed in claim 1, wherein each of said connecting plates has:
   a widened portion;
   a first neck portion that is connected between said widened portion and said circular limiting plate, and that is narrower than said widened portion; and
   a second neck portion that is connected between said widened portion and said base plate, and that is narrower than said widened portion.

3. The full-area touch device as claimed in claim 1, wherein:
   said bottom plate further has
      a bottom surface that is opposite to said top surface, and
      a positioning hole that extends through said bottom surface and said top surface;
   said nut member is formed as a stepped disc, and has
      a lower portion that engages said positioning hole,
      an upper portion that is connected to a top end of said lower portion, and that has an outer diameter greater than that of said lower portion, and
      a threaded hole that extends through said upper portion and said lower portion; and
   said bottom end portion of said adjusting member threadedly engages said threaded hole.

* * * * *